INVENTORS.
William L. McCracken &
Frank J. Opolski,
BY Paul & Paul
ATTORNEYS.

INVENTORS.
William L. McCracken &
Frank J. Opolski,
BY Paul & Paul
ATTORNEYS.

INVENTORS.
William L. McCracken &
Frank J. Opolski,
BY Paul & Paul
ATTORNEYS.

3,183,378
SANDWICH TRANSDUCER

William L. McCracken, Southfield, and Frank J. Opolski, Dearborn, Mich., assignors to Detrex Chemical Industries, Inc.

Filed Jan. 11, 1960, Ser. No. 1,606
5 Claims. (Cl. 310—8.7)

This invention relates to apparatus for transforming electrical energy to sound energy. More particularly, this invention relates to the use of piezoelectric or electrostrictive materials such as quartz or barium titanate in association with metals for effecting the transformation of radio frequency electrical energy to sound energy.

It is an object of this invention to provide a transducer for effecting the transformation of electrical energy to sound energy wherein the quantity of piezoelectric or electro-strictive material required to produce the desired resonance is reduced to a minimum.

It is another object of this invention to provide a transducer for effecting the transformation of electrical energy to sound energy wherein only metal is positioned at the nodal zone thereof, thereby producing a very durable transducer which is, for all practical purposes, shock proof since breakage of the piezoelectric or electro-strictive material as a consequence of normal stress at the nodal zone during operation is thereby avoided.

It is another object of this invention to provide a transducer for effecting the transformation of electrical energy to sound energy wherein no electrical leads whatever are connected directly to the surface electrodes of the piezoelectric or electro-strictive material.

It is another object of this invention to provide a transducer for effecting the transformation of electrical energy to sound energy wherein the sonic frequency or resonance may be varied over wide ranges while utilizing the same quantity of piezoelectric or electro-strictive materials by merely changing the thickness of the metal components thereof.

It is another object of this invention to provide a transducer for effecting the transformation of electrical energy to sound energy which may be produced at a much lower cost than other transducers made only of piezoelectric or electro-strictive materials heretofore used to perform the same function.

It is another object of this invention to provide a transducer for effecting the transformation of electrical energy to sound energy in which the driving impedance thereof is much lower than the driving impedance of any solid block of piezoelectric or electro-strictive materials heretofore used which is of the requisite size to perform the same function.

It is another object of this invention to provide a transducer for the conversion of radio frequency electrical energy into sound energy wherein the radio frequency voltage required to drive said transducer is much lower than the corresponding voltage required to drive a solid block of piezoelectric or electro-strictive materials heretofore used to perform the same function.

It is another object of this invention to provide a transducer for effecting the transformation of radio frequency electrical energy to sound energy in which component failure due to dielectric breakdown and leakage due to dirt and chemical deposits, and the like, which frequently form on the surface of such transducers when operated in the presence of plant atmosphere, are reduced to a minimum.

It is another object of this invention to provide a transducer for converting electrical energy into sound energy which may be constructed to produce a variety of frequency ranges and to provide any size radiating area desired.

Other objects and attendant advantages will become apparent hereinafter and in the drawings wherein.

Figures 1, 2, 3:
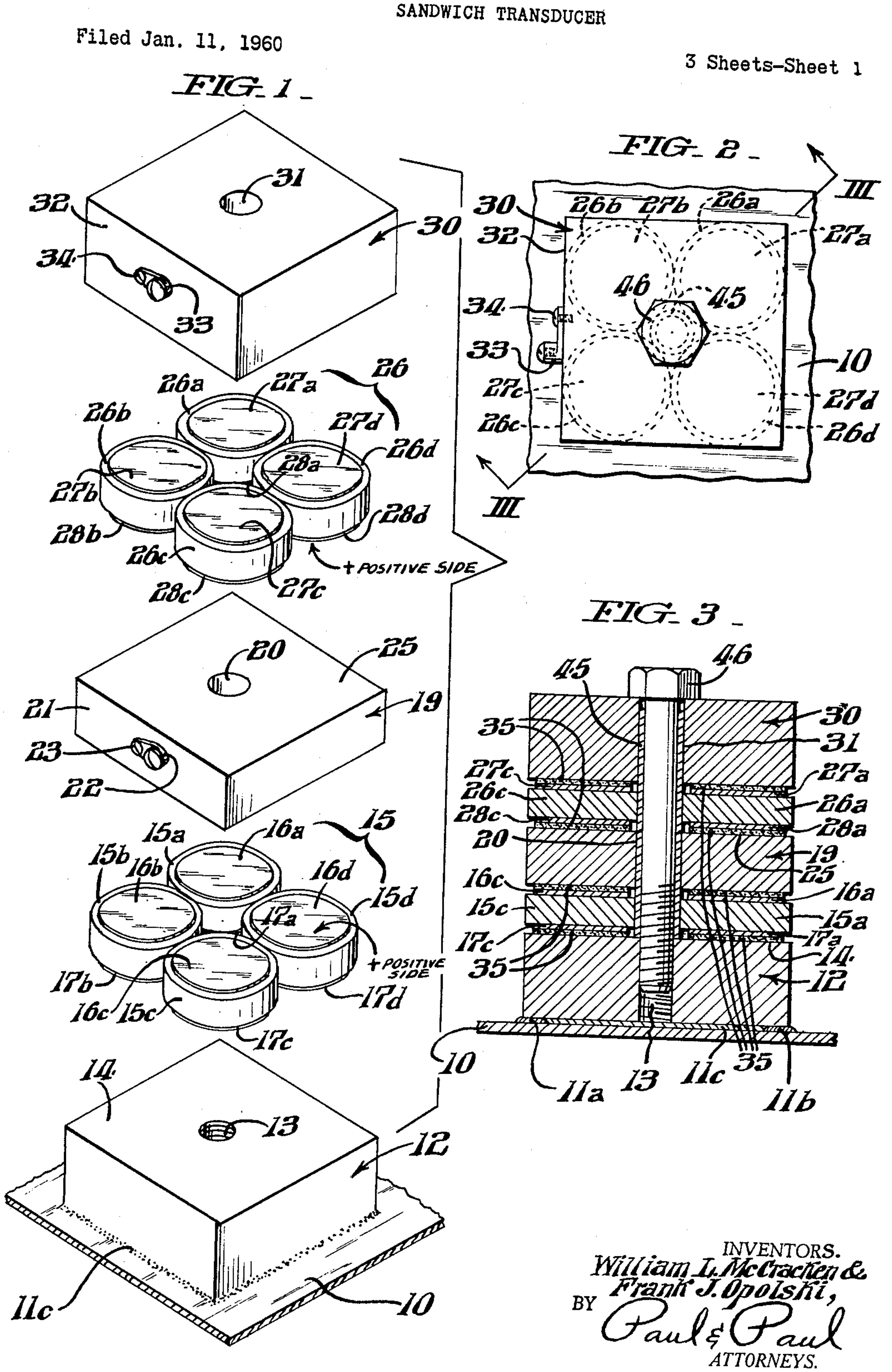
FIG. 1 is an exploded view of a transducer as provided in accordance with this invention.
FIG. 2 is a plan view of a transducer at one stage of its construction.
FIG. 3 is a cross-sectional view of a transducer taken as indicated by the lines and arrows III—III of FIG. 2.

The following description is directed to the specific form of the invention as shown in the drawings and is not intended to be addressed to the scope of the invention as exemplified thereby. It will be appreciated that the drawings represent preferred embodiments of the invention which is capable of being practiced in a wide variety of forms and arrangements.

Adverting herewith to the specific form of the invention illustrated in the drawings, the numeral 10 designates a relatively thin metallic membrane to which is secured by spot welds 11*a* and 11*b* and by copper brazing 11*c* a solid metal block of steel 12 at the center of which there is provided a threaded hole 13 extending through the width of the block. Disposed upon the upper face 14 of the metal block 12 are barium titanate discs 15*a*, 15*b*, 15*c* and 15*d*. Thin electrodes of silver metal 16*a*, 16*b*, 16*c* and 16*d* and 17*a*, 17*b*, 17*c* and 17*d* are secured to the upper and lower surfaces of the discs 15*a*, 15*b*, 15*c* and 15*d*, respectively.

Disposed upon the upper surface of the barium titanate discs 15 is another solid block of steel 19 having a central bore 20 extending therethrough at the center thereof. While the length and breadth of the metal block 19 are equal to the length and breadth of the metal block 12, the thickness or width of the block 19 is preferably only about two-thirds that of the block 12. To the surface of one side 21 of the metal block 19 there is attached a metal conductor lug 22 which is secured to side 21 by means of a straight metal drive screw 23 in a manner so as to make good electrical contact between the lug 22 and the metal block 19. On the top surface 25 of the block 19 are disposed barium titanate discs 26*a*, 26*b*, 26*c* and 26*d*. In like manner as before, thin electrodes of silver metal 27*a*, 27*b*, 27*c*, 27*d* and 28*a*, 28*b*, 28*c* and 28*d* are affixed to the upper and lower surfaces respectively of the discs 26. Disposed upon the top surfaces of barium titanate discs 26 adjacent the silver electrodes 27 is still another solid steel block 30 of the same dimensions as the block 12. A bore 31 extends through the width of the block 30 at the center thereof. Affixed to the side 32 of the block 30 is a metal conductor lug 33 which is secured to the side 32 of metal block 30 in a manner to secure good electrical contact therebetween by means of a straight metal drive screw 34.

Figures 4, 6:
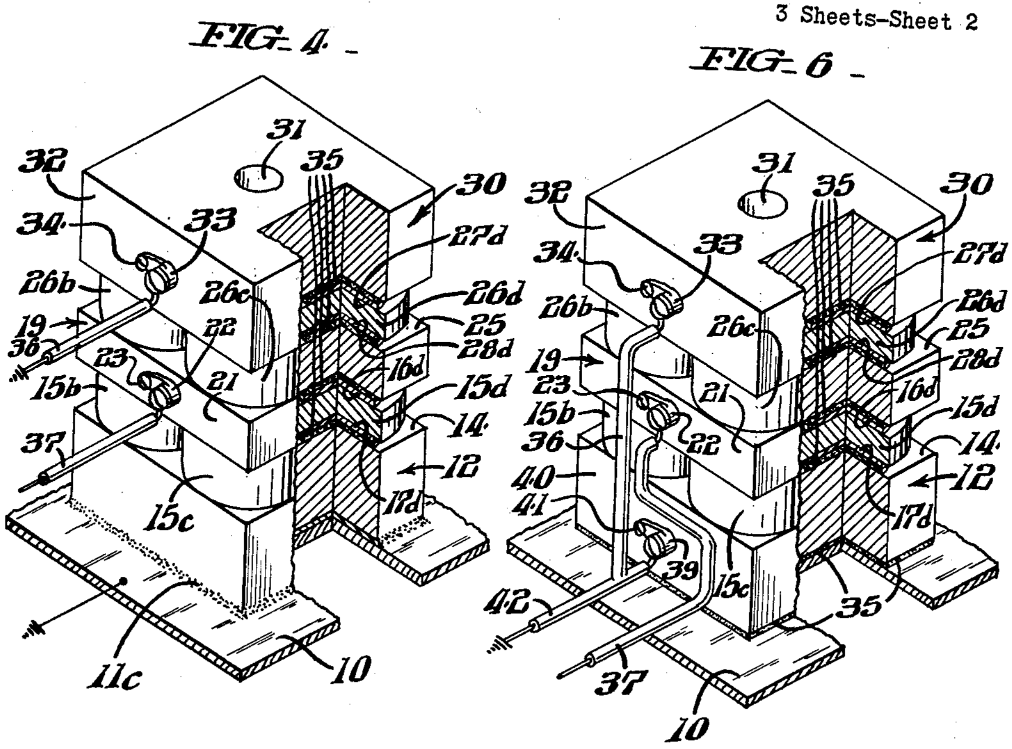
FIG. 4 is a view partly in perspective and partly in cross-section showing one specific arrangement of a transducer as provided in accordance with this invention.
FIG. 6 is a view partly in perspective and partly in cross-section of a modification of the transducer as provided in accordance with this invention.

As may be seen in FIGS. 3 and 4, the transducer when assembled comprises the steel blocks 12, 19 and 30 in superposed relation with the central bores 13, 20 and 31 in axial alignment. Sandwiched between the steel blocks 12 and 19 are the four barium titanate discs 15, and, likewise, sandwiched between the steel blocks 19 and 30, are the barium titanate discs 26. An epoxy cement 35 having contained therein a conducting medium such as very finely-divided solder powder, or similar conducting material, secures the silver electrodes 17*a*, 17*b*, 17*c* and 17*d* to the surface 14 of the steel block 12 and the silver electrodes 16*a*, 16*b*, 16*c* and 16*d* to the bottom surface of the steel block 19. Similarly, the epoxy cement 35 with finely divided conducting medium secures the electrodes 28*a*, 28*b*, 28*c* and 28*d* of the barium titanate discs 26 to the surface 25 of the steel block 19 and also the silver electrodes 27*a*, 27*b*, 27*c* and 27*d* to the bottom surface of the steel block 30.

As may be seen in FIG. 4, electric current-carrying wires 36 and 37 are connected to the lugs 33 and 22 respectively. As indicated diagrammatically in FIG. 4, the electrical current-carrying wire 36 is grounded, as is also the metallic membrane 10. Electric current-carrying wire 37 is provided for the input of electric current from a power source (not shown) capable of generating radio frequency electrical energy.

A modification of the transducer as provided in accordance with this invention is illustrated in FIG. 6 in which the brazing 11*c* between the metallic membrane 10 and the solid steel block 12 has been replaced by the epoxy cement 35 and still another conductor lug 39 is secured to the side 40 of the block 12 by a straight metal drive screw 41 so that good contact is made between the lug 39 and the block 12 for the passage of electricity. In the modified arrangement of the transducer illustrated in FIG. 6, the electric current-carrying wire 36 leading from the lug 33 is connected to the ground wire 42 which is in turn attached to the lug 39 affixed to the block 12. As in the previous form of the invention, the electric current-carrying wire 37 leads from the lug 22 affixed to the block 19 to a source of radio frequency electrical energy (not shown).

It is an important characteristic of the transducer as provided in accordance with this invention that the nodal zone of the stack falls within the block 19. While any convenient method of assembly of the transducer stack may be used which meets the requirement that the nodal zone of the transducer falls within the middle block of the stack, a preferred method of assembly is as follows:

The steel block 12 is sandblasted on the top side thereof and thoroughly cleaned. The steel membrane 10 is thoroughly cleaned to remove all oil and loose particles after which the block 12 is spot welded to the steel membrane 10 in two or more spots, leaving the sand blasted side of the block 12 upward. Prior to the cleaning of the block 12, the hole 13 is drilled and tapped in the center of the block for the reception of a threaded cap screw. Both sides of the block 12 are carefully freed of burrs and the like. A slug of copper is then dropped into the tapped hole 13 and the unit is placed in the furnace. After sufficient heat has been applied to deoxidize the block 12 and the steel mmebrane 10 and to melt the copper, the block 12 is thoroughly brazed to the steel membrane 10 by the melted copper which completely fills the void between the block 12 and the aforesaid membrane. Barium titanate discs 15*a*, 15*b*, 15*c* and 15*d* having silver electrodes 16*a*, 16*b*, 16*c* and 16*d* on the upper side thereof and silver electrodes 17*a*, 17*b*, 17*c* and 17*d* on the lower side thereof are now thoroughly cleaned. A thin coating of epoxy cement 35 containing finely-divided solder powder is smeared on the discs and the discs are then placed on block 12 with a slight twisting motion to be certain that they are properly seated and that the epoxy cement has spread into a continuous film between the block 12 and the discs 15. Each of the barium titanate discs 15 is placed on the steel block 12 so that the positive electrode of each disc is opposite said block and facing upward. Prior to placing the barium titanate discs 15 on the block 12, the hole 13 is retapped in order to remove any copper that might adhere to the threads of the tapped hole. The steel block 19 is now sandblasted on both sides and thoroughly cleaned. Prior to the sandblasting, a hole 20 is drilled in the center of the block. All burrs from both sides of the block are carefully removed. A thin layer of the prepared cement 35 is now smeared on the positive faces of discs 15*a*, 15*b*, 15*c* and 15*d*, and the block 19 is carefully placed on the aforesaid discs and seated while using a slight twisting motion to make sure that the film of cement wets the surface of block 19 and that a continuous cement film has been formed between block 19 and the discs 15. A masking sleeve 45, preferably plastic, is now inserted into the hole 20. The purpose of the masking sleeve is to prevent the cement from adhering to the cap screw during the subsequent firing operation. The second set of barium titanate discs 26*a*, 26*b*, 26*c* and 26*d* is now cemneted to block 19 in the same manner as the discs 15 were previously described as cemented to the block 12, making sure that the positive electrode of the barium titanate discs 26 are facing the block 19. The positive electrodes of both sets of discs 15 and 26 are now facing each other and facing block 19. Steel block 30 having the hole 31 drilled therein is now prepared in the same manner as block 19 except that it is sandblasted only on the side which will face the barium titanate discs 26. Block 30 is then secured to the top of the second set of the barium titanate discs 26 using the epoxy cement 35 and in the same manner that block 19 was cemented to the first set of barium titanate discs 15.

A threaded cap screw 46 is now pushed through holes 31 and 20 and through the masking sleeve and screwed into the hole 13. The stack is then aligned by hand and the cap screw 46 is tightened with a torque wrench until a torque of 50 inch pounds has been reached. The assembly is then placed in an oven until the cement 35 is cured. Thereafter, the assembly is removed from the oven and the cap screw removed therefrom. As many of the transducer stacks as desired may be attached to the steel membrane 10 and if the dimensions of the stacks have been held the same, they will all operate upon the same frequency.

The frequency upon which a given stack will operate depends upon the dimensions of the steel blocks and the thickness of the metal membrane used in the assembly of the transducer stack. For example, a transducer which will give a frequency of approximately 30 kilocycles, when mounted on an 18 gauge steel membrane in the manner aforedescribed, may be constructed from component elements having the following dimensions: steel blocks 12 and 30—2" by 2" by ¾"; steel block 19—2" by 2" by ½"; barium titanate discs 15 and 26—1" diameter by ¼" thick. Using the same size barium titanate discs, it is possible to construct transducer stacks of varying frequency over wide ranges by merely changing the thickness of the metal blocks 12, 19 and 30. As the thickness of the membrane increases, care must be taken in the design of the block 12 to insure that the aforementioned nodal point of the transducer stack falls within block 19. For example, if the membrane is ⅜" thick, the block 12 will be somewhat thinner than the block 30. It will be clear from the foregoing description that the steel blocks, 12, 19 and 30, themselves act as electrodes in the operation of the transducer stack as provided in accordance with this invention.

The assembly of the modified transducer stack as illustrated in FIG. 6, is preferably accomplished as aforedescribed with the exception that instead of spot welding and brazing the block 12 to the membrane 10, the epoxy cement with finely-divided solder particles is substituted for the welding and brazing.

Figures 7, 8:
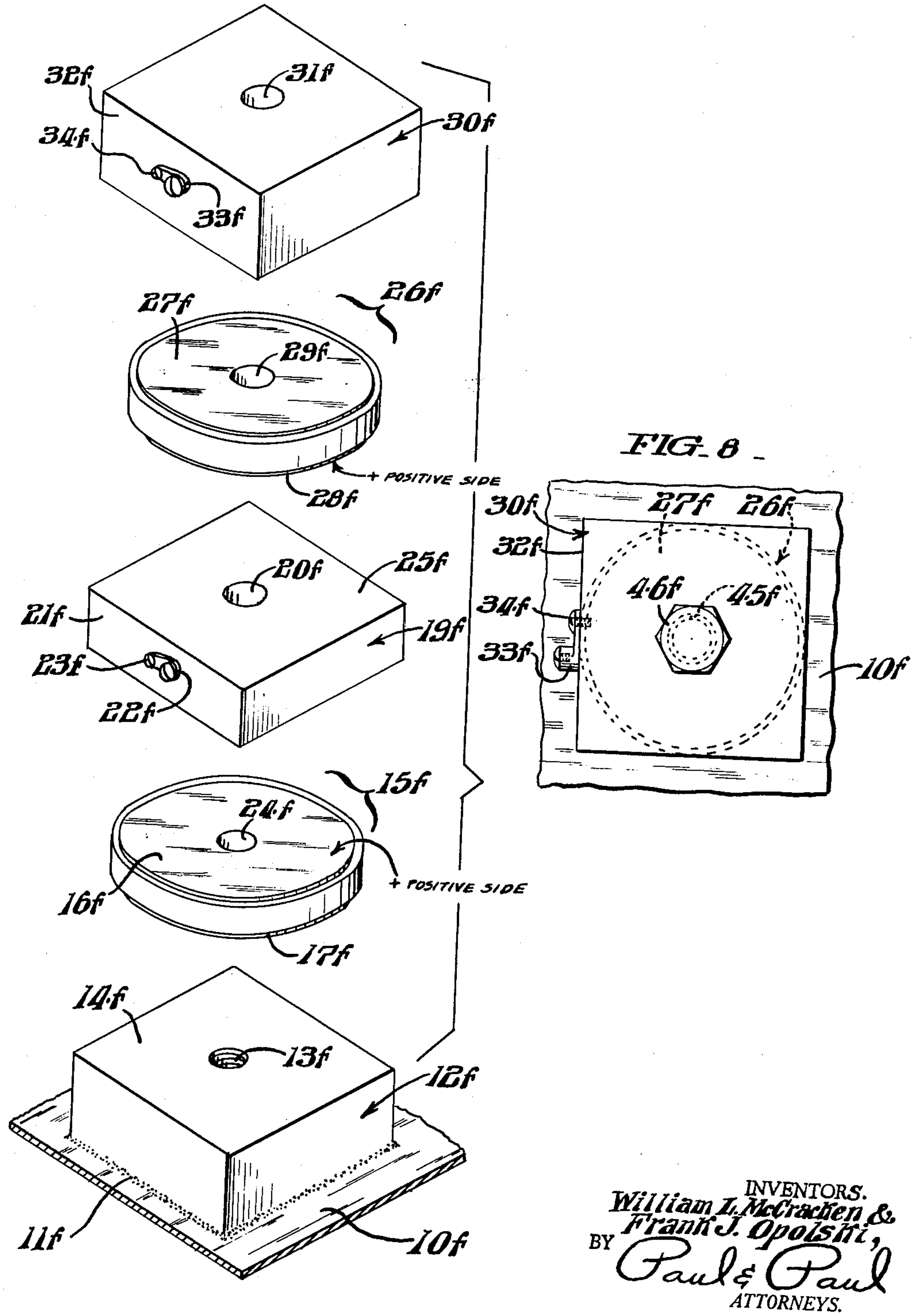
FIG. 7 is an exploded view similar to FIG. 1, illustrating a modified form of transducer, as provided in accordance with this invention.
FIG. 8 is a view in plan similar to FIG. 2 of the modified transducer illustrated in FIG. 7.

A further modification of the transducer, as provided in accordance with this invention, is illustrated in FIGURES 7 and 8 in which a relatively thin metal membrane 10*f* is secured by copper brazing 11*f* to a solid block of steel metal 12f at the center of which there is provided a threaded hole 13f extending through the width of the block. Adjacent the upper face 14f of the metal block 12f is a disc 15f having thin electrodes of silver metal 16f and 17f secured respectively to the upper and lower surfaces thereof. A hole 24f of dimension comparable to that of hole 13f in block 12f, is provided in the center of the disc 15f.

Adjacent the silver electrodes 16f on the upper surface of the barium titanate disc 15f is another solid block of steel 19f having a central bore 20f extending therethrough at the center thereof. The length and breadth of the metal block 19f are equal to the length and breadth of the metal block 12f but the thickness or width of the block 19f is preferably only about two-thirds that of the block 12f. To the surface of a side 21f of the metal block 19f, there is attached a metal conductor lug 22f, which is secured to the side 21f by means of a straight metal drive screw 23f in a maner so as ton make good electrical contact between the lug 22f and the metal block 19f. Adjacent the top surface 25f of the block 19f is disposed a barium titanate disc 26f having thin electrodes of silver metal 27f and 28f affixed to the upper and lower surfaces, respectively, of the disc 26f. In like manner, as before, a circular hole 29f extends through the disc 26f at the center thereof. Adjacent the electrode 27f affixed to the top surface of the barium titanate disc 26f is still another solid steel block 30f of the same dimensions as the block 12f. A hole 31f extends through the width of the block 30f at the center thereof. Affixed to the side 32f of the block 38f is a metal conductor lug 33f which is secured to the side 32f of the metal block 30f in a manner to secure good electrical contact therebetween by means of a straight metal drive screw 34f.

The modification of the invention illustrated in FIGURES 7 and 8 may be assembled in like manner as described in the previous form of the invention. The centrally positioned holes 24f and 29f of the barium titanate discs 15f and 26f, respectively, are provided for the reception of a masking sleeve and threaded cap screw when assembling the transducer in the manner hereinbefore described in connection with the previous form of the invention.

Figure 5:
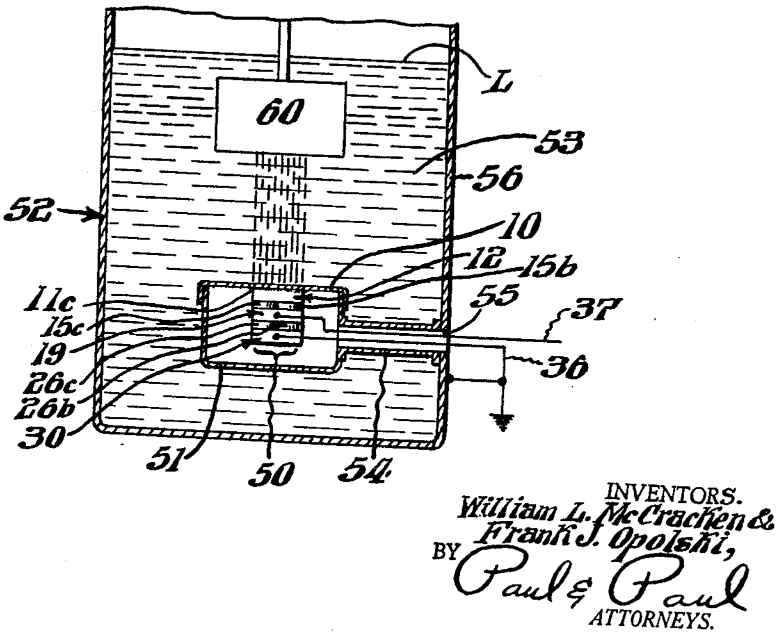
FIG. 5 is a diagrammatic representation of the operation of a transducer as provided in accordance with this invention.

FIG. 5 diagrammatically illustrates one manner of use of the transducer stack as provided in accordance with this invention. A transducer 50 is suspended from a radiating membrane 10 within a housing 51, which is itself positioned within a tank 52 containing a cleaning fluid 53 substantially filling the aforesaid tank. The radiating membrane 10 provides a cover for the housing 51 which is submerged within the fluid 53 well below the level L thereof. A conduit 54 extends from the housing 51 to an opening 55 in the wall 56 of the tank 52 and carries electric current-carrying wires 36 and 37 attached respectively to solid metal blocks 30 and 19 of the transducer stack 50. As represented in FIG. 5, the conducting line 36 leads to the ground. The line 37 leads to a source of radio frequency electrical energy (not shown). Submerged in the fluid 53 below the level L is a work piece 60 positioned within the tank so as to be acted upon by the sonic energy produced by the transducer stack 50 and its vibrating membrane 10.

Ordinarily in the practice of this invention, work piece 60 is suspended in the cleaning fluid 53 as illustrated in FIG. 5 and the generator of radio frequency electrical energy is turned on. As a result, sonic energy, in the frequency determined by the specific construction of the transducer stack as aforedescribed, is produced and radiated by means of membrane 10 so that it acts upon the work piece 60 to effect the cleaning of the portion of the work object submerged within the cleaning fluid L.

It will be appreciated that although this invention has been described with respect to one specific embodiment and modification thereof, the invention is in no way limited thereto. For example, the transducer stack, as provided in accordance with this invention and used in the manner illustrated in FIG. 5, need not be affixed to a radiating membrane independently of the tank with which said transducer is used. On the contrary, the transducer may be affixed to the sides or bottom of a tank constructed of suitable sheet metal to provide a radiating surface whereby the purpose of the invention may be equally successfully effectuated.

It will be apparent that a very great advantage of this invention is realized by the manner of its construction wherein the nodal zone of the transducer stack falls only within a portion of the stack occupied by a solid block of metal, thereby obviating the danger that the piezoelectric materials will rupture or break as a result of normal stress in the nodal zone.

Another important advantage of this invention lies in the manner in which transducers capable of producing sonic energy over a wide range of frequencies may be constructed by merely changing the thickness of the metal blocks used in the stack without changing or otherwise varying the quantity of piezoelectric materials used.

Still another significant advantage of the invention is derived from the fact that the driving impedance of the transducer stack as constructed in accordance therewith is much lower than the driving impedance of a solid block of piezoelectric or electro-strictive material which is of the requisite size to perform the same function. Moreover, a much lower voltage is required to drive the transducer than is otherwise required to drive any solid block of piezoelectric material heretofore used to perform the same function. As a result of the lower voltage required, fewer generator component failures due to dielectric breakdowns, and the like, are realized in the use of the transducer as provided in accordance with this invention.

It is a further advantageous feature of this invention that the quantity of piezoelectric or electro-strictive material which need to be used to obtain a given frequency is reduced to a minimum.

Although this invention has been disclosed, with reference to specific forms and embodiments thereof, it will be evident that a great number of variations may be made without departing from the spirit and the scope of this invention. For example, parts may be reversed, equivalent elements may be substituted for those specifically disclosed, and certain features of the invention may be used independently of other features, all without departing from the spirit and scope of this invention as defined in the appended claims.

Having thus described our invention, we claim:

1. An electro-mechanical transducer system for conversion of electrical energy into sonic energy, said system including a metal membrane for radiating sonic energy, said membrane having mechanically and conductively secured thereto a transducer comprised of a stack of alternating layers of metal of similar kind and of piezoelectric material secured together mechanically and conductively, the individual thickness dimensions of the metal layers being substantially greater than the individual thickness dimension of the piezo-electric layers, the two end and center layers of said stack being of said metal of similar kind, and means for applying alternating-current energy between the center metal layer and the two end metal layers of the transducer stack to cause said stack and membrane to vibrate mechanically, the thickness dimensions of said metal radiating membrane and of said layers of metal of similar kind in said transducer stack being so selected that the nodal zone of the mechanical vibration set up by the applied electrical energy falls within said center metal layer.

2. An electro-mechanical transducer system as claimed in claim 1 characterized in that said metal membrane is steel, and in that said metal layers of similar kind are steel.

3. An electro-mechanical transducer system as claimed in claim 2 characterized in said layers of steel and of piezo-electric material are cemented together with a conductive cement.

4. An electro-mechanical transducer system as claimed in claim 3 characterized in that said conductive cement is an epoxy resin having finely-divided solder powder distributed therethrough.

5. An electro-mechanical transducer system for conversion of electrical energy into sonic energy, said system comprising a metal membrane free to vibrate for radiating sonic energy, said membrane having mechanically and conductively secured thereto a transducer comprised of a stack of alternating layers of metal and of piezo-electric material secured together mechanically and conductively, the two end and center layers of said stack being of metal, both end layers being free to vibrate along the axis of said stack, and means for applying alternating-current energy between the center metal layer and each of the two end metal layers of the transducer stack to cause said stack and membrane to vibrate mechanically, the thickness dimensions of said metal radiating membrane and of said layers of metal in said stack being so selected that the nodal zone of the mechanical vibration set up by the applied electrical energy falls within said center metal layer.

References Cited by the Examiner

UNITED STATES PATENTS

| | | | |
|---|---|---|---|
| 2,096,826 | 10/37 | Schrader | 310—8.7 |
| 2,947,889 | 8/60 | Rich | 310—8.7 |
| 3,101,419 | 8/63 | Rich | 310—8.7 |

FOREIGN PATENTS

| | | |
|---|---|---|
| 622,035 | 5/27 | France. |

MILTON O. HIRSHFIELD, *Primary Examiner.*

HERMAN K. SAALBACH, ELI J. SAX, *Examiners.*